(12) United States Patent
Tang et al.

(10) Patent No.: US 7,859,405 B2
(45) Date of Patent: Dec. 28, 2010

(54) WIRELESS SENSING DEVICE AND WIRELESS NETWORK SENSING SYSTEM

(75) Inventors: Min-Tsung Tang, Taoyuan Hsien (TW); Su-Fen Liu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 392 days.

(21) Appl. No.: 11/968,547

(22) Filed: Jan. 2, 2008

(65) Prior Publication Data

US 2008/0165019 A1   Jul. 10, 2008

(30) Foreign Application Priority Data

Jan. 5, 2007   (TW) .............................. 96100440 A

(51) Int. Cl.
    *G08B 1/08* (2006.01)
(52) U.S. Cl. .............................. 340/539.26; 340/539.1; 340/539.3; 340/635; 340/7.37
(58) Field of Classification Search ............ 340/539.26, 340/539.1, 539.21, 539.22, 539.24, 635, 340/636.16, 636.17, 636.1; 370/338
    See application file for complete search history.

(56) References Cited

U.S. PATENT DOCUMENTS

| 7,408,453 | B2 * | 8/2008 | Breed .......................... 340/442 |
| 7,586,888 | B2 * | 9/2009 | Wang .......................... 370/338 |
| 2008/0117037 | A1 * | 5/2008 | Kenny et al. ................ 340/447 |

* cited by examiner

*Primary Examiner*—Davetta W Goins
(74) *Attorney, Agent, or Firm*—Birch, Stewart, Kolasch & Birch, LLP

(57) ABSTRACT

A wireless sensing device includes a processing module, a wireless communication module, at least one sensing element, a power module and a power-monitoring module. The wireless communication module is electrically connected with the processing module to transmit or receive a wireless communication signal. The sensing element is electrically connected with the processing module to transmit a sensing signal to the processing module. The power module is electrically connected with and supplies a power to the processing module, the wireless communication module and the sensing element. The power-monitoring module is electrically connected with the processing module and the power module to transmit a power-monitoring signal to the processing module.

27 Claims, 4 Drawing Sheets

WIRELESS SENSING DEVICE AND WIRELESS NETWORK SENSING SYSTEM

CROSS REFERENCE TO RELATED APPLICATIONS

This Non-provisional application claims priority under 35 U.S.C. §119(a) on Patent Application No(s). 096100440 filed in Taiwan, Republic of China on Jan. 5, 2007, the entire contents of which are hereby incorporated by reference.

BACKGROUND OF THE INVENTION

1. Field of Invention

The invention relates to a sensing device and a sensing system and, in particular, to a wireless sensing device and a wireless network sensing system.

2. Related Art

Sensing devices have been widely used in industries nowadays. For example, a temperature sensing device is utilized to monitor an environmental temperature, a humidity sensing device is utilized to monitor an environmental humidity and an optical sensing device is utilized to monitor an environmental brightness. Arranging the sensing devices at different positions can construct a sensing system or a monitoring system for monitoring the environment so as to warn unpredictable problems in advance. Therefore, it can enhance the overall efficiency.

In addition, the development of the wireless communication technology has been speeded up due to the progress of the technology. Then, the sensing device has been manufactured to have the wireless function in the industry. That is, the sensing device and a wireless communication module are utilized to achieve the object of wireless communication. Referring to FIG. 1, a conventional wireless sensing device 1 includes a wireless communication module 11, a micro-controller module 12 and a sensing element 13. The wireless communication module 11 is electrically connected with the micro-controller module 12 to transmit/receive a wireless signal. The sensing element 13 is electrically connected with the micro-controller module 12 to transmit a sensing signal to the micro-controller module 12. The micro-controller module 12 controls the wireless communication module 11 and the sensing element 13.

Moreover, arranging a plurality of wireless sensing devices 1 at different positions can construct a wireless sensing system. As shown in FIG. 2, a conventional wireless sensing system 2 includes the plurality of wireless sensing devices 1 and a server 21. Each wireless sensing device 1 transmits the sensed information to the server 21 via the wireless signal to achieve the overall monitoring object.

However, each manufacturer develops the associated wireless communication interface individually and performs the associated sensing and monitoring operations under its specific communication architecture. Therefore, the problems of system integration and product compatibility always exist so that a common communication interface cannot be manufactured. In addition, the conventional wireless sensing system 2 is usually limited to the peer-to-peer relationship or is only limited to the single peer to multiple peers application. The wireless signal only can be transmitted in the unidirectional manner, such as the transmission from the wireless sensing device 1 of FIG. 2 to the server 21, and cannot be transmitted in the bi-directional manner. In addition, the conventional wireless sensing system 2 can only support limited amounts of wireless sensing devices 1. This is because the server 21 may have the heavy loading, thereby causing the system to become unstable and increasing the cost. In addition, because the wireless communication interface is developed by the manufacturers themselves, the wireless signal transmitted by the wireless sensing device 1 often interferes with other signals by other electronic apparatuses, thereby increasing the signal error rate.

SUMMARY OF THE INVENTION

In view of the foregoing, the invention is to provide a wireless sensing device and a wireless network sensing system capable of using the universal wireless communication protocol to have the advantages that the device and the system can be easily expanded, can resist the signal interference and can perform the bi-directional communication so that the overall efficiency can be enhanced.

To achieve the above, a wireless sensing device of the invention includes a processing module, a wireless communication module, at least one sensing element, a power module and a power-monitoring module. The wireless communication module is electrically connected with the processing module to transmit or receive a wireless communication signal. The sensing element is electrically connected with the processing module to transmit a sensing signal to the processing module. The power module is electrically connected with and supplies a power to the processing module, the wireless communication module and the sensing element. The power-monitoring module is electrically connected with the processing module and the power module to transmit a power-monitoring signal to the processing module.

To achieve the above, the invention also discloses a wireless network sensing system having a plurality of wireless sensing devices for transmitting or receiving a wireless communication signal therebetween. Each wireless sensing device includes a processing module, a wireless communication module, a sensing element, a power module and a power-monitoring module. The wireless communication module is electrically connected with the processing module to transmit or receive the wireless communication signal. The sensing element is electrically connected with the processing module to transmit a sensing signal to the processing module. The power module is electrically connected with and supplies a power to the processing module, the wireless communication module and the sensing element. The power-monitoring module is electrically connected with the processing module and the power module to transmit a power-monitoring signal to the processing module.

As mentioned above, a wireless communication signal is transmitted or received in the wireless sensing device and the wireless network sensing system according to the invention. The wireless communication signal satisfies the universal wireless communication protocol, such as IEEE 802.15.4 protocol, so as to facilitate the system integration and the enhancement of the product compatibility. Compared with the related art, the invention satisfies the universal wireless communication protocol, so the invention has the advantages that the device and the system can be easily expanded, can resist the signal interference and can perform the bi-directional communication so that the overall efficiency can be enhanced. In addition, the wireless sensing device monitors the power state by the power-monitoring module so that the usage efficiency and the product reliability can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
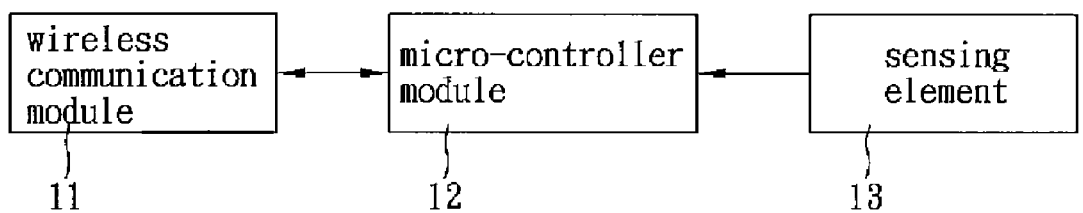
FIG. 1 is a schematic illustration showing a conventional wireless sensing device.
Figure 2:
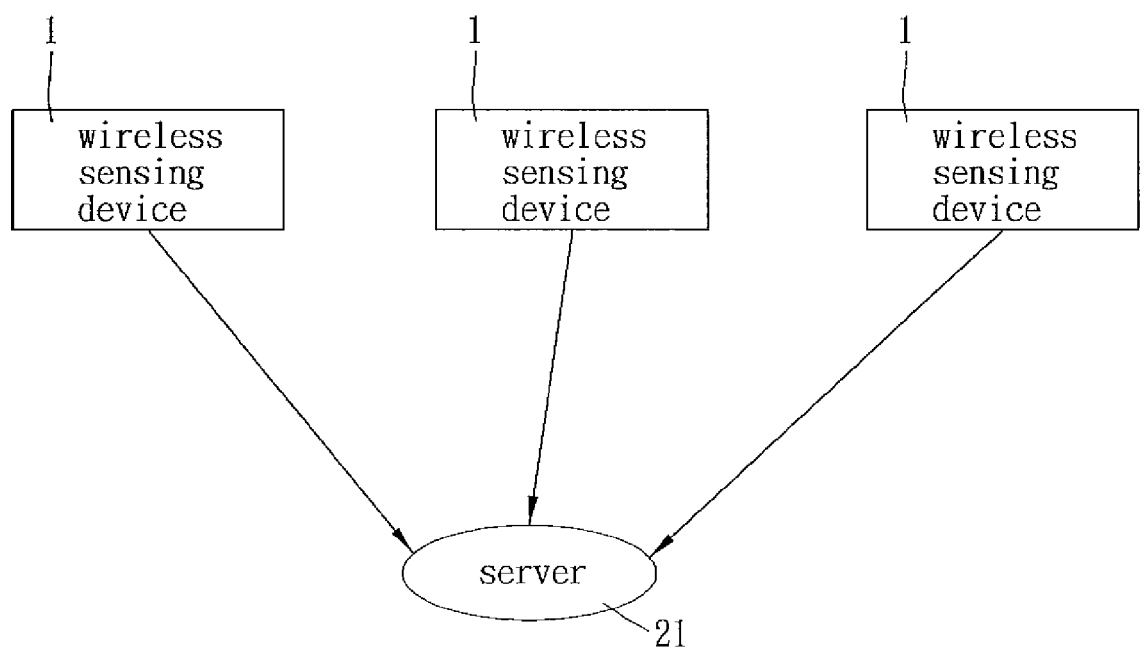
FIG. 2 is a schematic illustration showing a conventional wireless sensing system.
Figure 3:
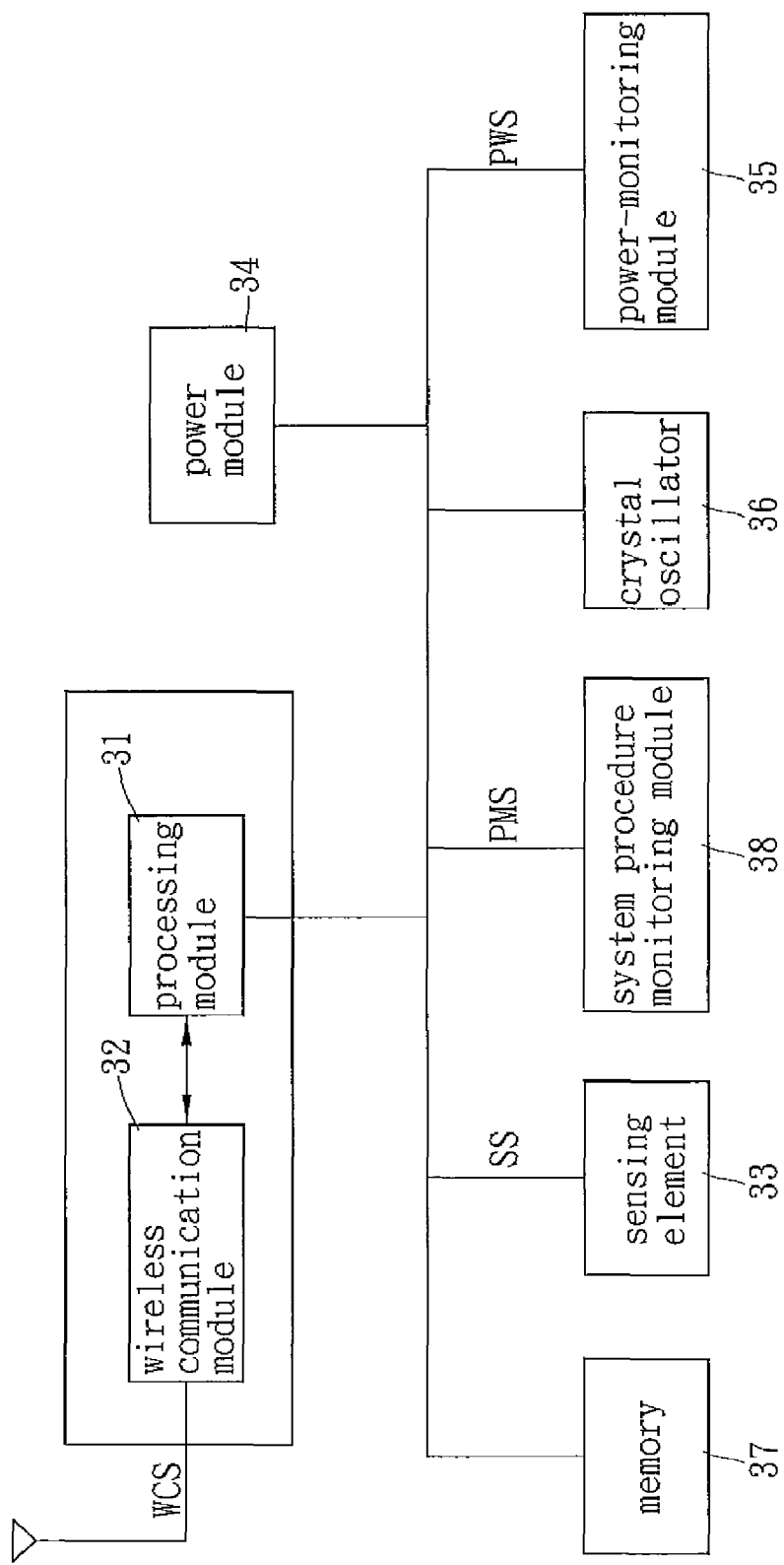
FIG. 3 is a schematic illustration showing a wireless sensing device according to an embodiment of the invention.

Referring to FIG. 3, a wireless sensing device 3 according to an embodiment of the invention includes a processing module 31, a wireless communication module 32, at least one sensing element 33, a power module 34 and a power-monitoring module 35.

The wireless communication module 32 is electrically connected with the processing module 31 to transmit or receive a wireless communication signal WCS. In this embodiment, the wireless communication module 32 can be implemented by a base band circuit and a radio frequency (RF) circuit. The base band circuit mainly provides connection establishment and elimination, signal encoding, packet processing and frequency hopping control. The radio frequency circuit mainly provides carrier synthesis, signal reception and signal transmission. In addition, the wireless communication module 32 further has an antenna (not labeled) for transmitting or receiving the wireless communication signal WCS having an electromagnetic waveform. In this embodiment, the antenna can be a build-in antenna or an external antenna.

The wireless communication signal WCS of this embodiment can satisfy the IEEE 802.15.4 protocol, which is specified in the Zigbee wireless communication technology, applied to a wireless personal area network (WPAN) and adapted to the electronic device with the low data rate and the low power-consumption. In addition, the Zigbee wireless communication technology utilizes the CSMA-CA (Carries Sense Multiple Access with Collision Avoidance), so the wireless sensing device 3 has the ability of resisting the signal interference and the high signal stability.

The processing module 31 includes a central processing unit (CPU) or a micro-controller unit (MCU) for processing the signal and controlling other elements of the wireless sensing device 3. In addition, the wireless sensing device 3 further has a crystal oscillator 36, which is electrically connected with the processing module 31 and provides a clock signal. In addition, the processing module 31 further has a transmission interface for communicating with other peripheral devices. Herein, the transmission interface can be selected from a group consisting of a universal asynchronous receiver/transmitter (UART), an inter-integrated circuit (I2C) bus and a serial peripheral interface (SPI). In addition, the processing module 31 and the wireless communication module 32 can be constructed in different chips or a single chip in this embodiment.

The sensing element 33 is electrically connected with the processing module 31 to transmit a sensing signal SS to the processing module 31. Herein, the sensing element 33 can be selected from one of the group consisting of a temperature sensor, a humidity sensor and a photosensor for sensing the environmental temperature, humidity and brightness and transmitting the sensed information to the processing module 31 through the sensing signal SS. In addition, the wireless sensing device 3 further has a memory 37, such as a flash memory electrically connected with the processing module 31. The processing module 31 can store the sensed information into the memory 37.

The power module 34 is electrically connected with the processing module 31, the wireless communication module 32 and the sensing element 33 to supply a power Herein, the power supplied by the power module 34 is a DC power, and the power module 34 can be powered by a battery or an external power supply. The Zigbee wireless communication technology has the advantage of low power-consumption, so the wireless sensing device 3 using the battery can operate for a long time. In addition, when the wireless sensing device 3 is powered by the external power supply, an AC/DC converter for conversion can be used to facilitate the power supplying operation.

The power-monitoring module 35 is electrically connected with the processing module 31 and the power module 34 to transmit a power-monitoring signal PWS to the processing module 31. In this embodiment, the wireless sensing device 3 can momentarily obtain the state of the power supply through the power-monitoring module 35 so as to enhance the efficiency and the reliability of the wireless sensing device 3. In addition, the wireless sensing device 3 further has a system procedure monitoring module 38 electrically connected with the processing module 31. Herein, the system procedure monitoring module 38 can be a watchdog timer chip, which transmits a procedure monitoring signal PMS, such as a reset signal, to the processing module 31. Thus, after the wireless sensing device 3 is abnormally shut down or powered off, the wireless sensing device 3 can recover to the initially predefined value and reset so that the product reliability and the efficiency can be enhanced.

Figure 4:
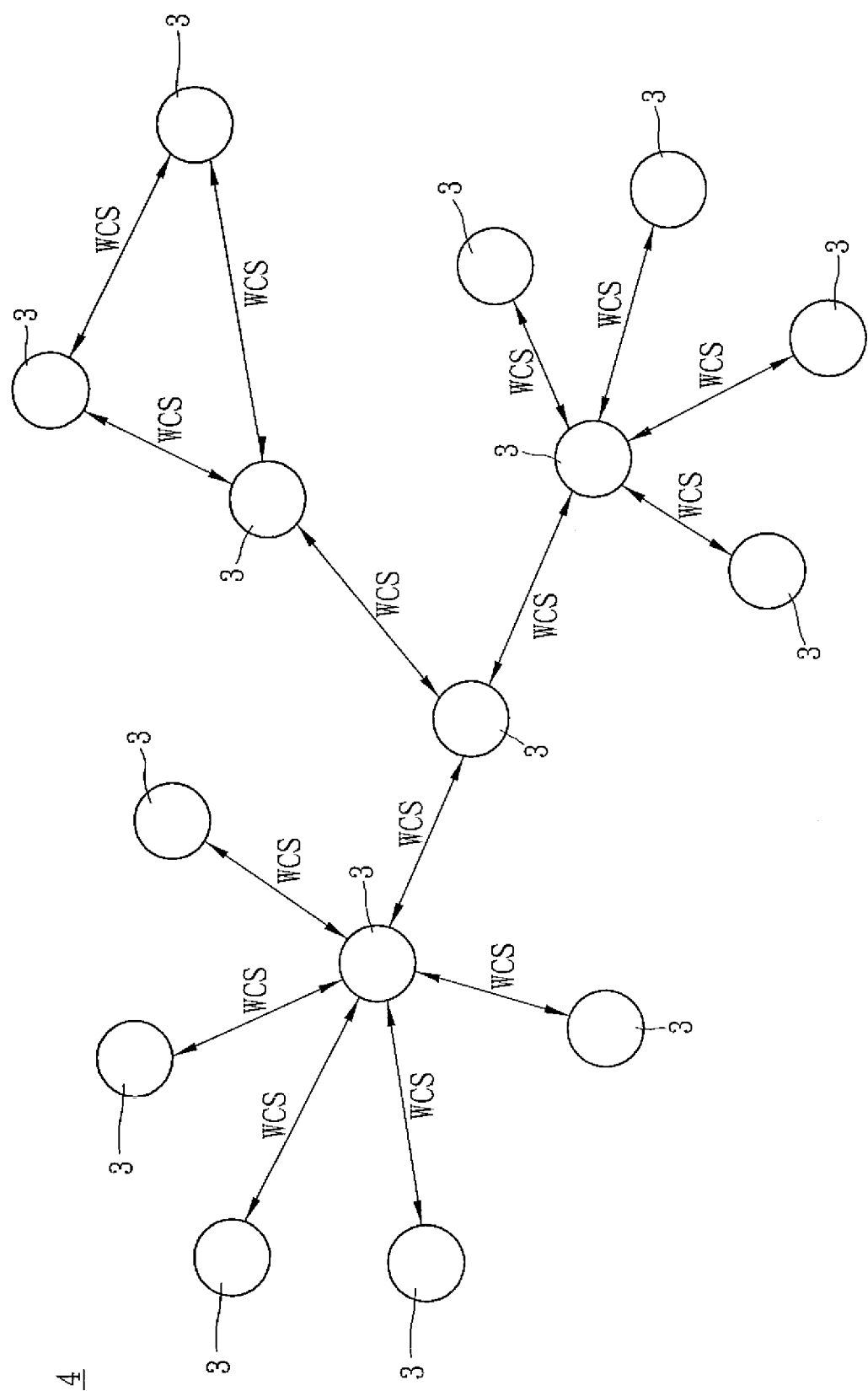
FIG. 4 is a schematic illustration showing a wireless network sensing system according to the embodiment of the invention.

As shown in FIG. 4, a wireless network sensing system 4 according to the embodiment of the invention is composed of a plurality of wireless sensing devices 3 for transmitting or receiving a wireless communication signal WCS therebetween. In the application of the Zigbee wireless communication technology, the wireless sensing devices 3 can be arranged in a star-like, net-like or tree-like topology. Theoretically, one wireless sensing device 3 can support up to 65536 end devices to perform the wireless communication with respect to one net-like arrangement. In addition, in the application of the Zigbee wireless communication technology, the wireless sensing device 3 can further communicate with other wireless sensing devices 3 bi-directionally.

To be noted, the wireless network sensing system 4 can not only be constituted by the wireless sensing devices 3, but also can be constituted by wireless devices using the same communication protocol.

In summary, a wireless communication signal is transmitted or received in the wireless sensing device and the wireless network sensing system according to the invention. The wireless communication signal satisfies the universal wireless communication protocol, such as IEEE 802.15.4 protocol, and can be applied to the Zigbee wireless communication technology to facilitate the system integration and the enhancement of the product compatibility. Compared with the related art, the invention satisfies the universal wireless communication protocol, so the invention has the advantages that the device and the system can be easily expanded, can resist the signal interference and can perform the bi-directional communication so that the overall efficiency can be enhanced. In addition, the wireless sensing device monitors the power state by the power-monitoring module so that the usage efficiency and the product reliability can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless sensing device comprising:
   a processing module;
   a wireless communication module electrically connected with the processing module to transmit or receive a wireless communication signal;
   at least one sensing element electrically connected with the processing module to transmit a sensing signal to the processing module;
   a power module electrically connected with and supplying a power to the processing module, the wireless communication module and the sensing element; and
   a power-monitoring module electrically connected with the processing module and the power module to transmit a power-monitoring signal to the processing module,
   wherein the wireless communication module comprises a base band circuit and a radio frequency circuit, the base band circuit provides connection establishment and elimination, signal encoding, packet processing and frequency hopping control, and the radio frequency circuit provides carrier synthesis, signal reception and signal transmission.

2. The wireless sensing device according to claim 1, wherein the wireless communication signal satisfies an IEEE 802.15.4 protocol.

3. The wireless sensing device according to claim 1, wherein the sensing element is a temperature sensor, a humidity sensor or a photosensor.

4. The wireless sensing device according to claim 1, wherein the power is a DC power.

5. The wireless sensing device according to claim 1, wherein the power module has a battery and/or an AC/DC converter.

6. The wireless sensing device according to claim 1, wherein the wireless communication module has an antenna, a build-in antenna or an external antenna.

7. The wireless sensing device according to claim 1, wherein the processing module has a transmission interface, a universal asynchronous receiver/transmitter (UART), an inter-integrated circuit (I2C) bus or a serial peripheral interface (SPI) for communicating with other peripheral devices.

8. The wireless sensing device according to claim 1, further comprising:
   a system procedure monitoring module electrically connected with the processing module to transmit a procedure monitoring signal to the processing module.

9. The wireless sensing device according to claim 8, wherein the system procedure monitoring module is a watchdog timer chip.

10. The wireless sensing device according to claim 1, further comprising a memory electrically connected with the processing module.

11. The wireless sensing device according to claim 1, further comprising a crystal oscillator electrically connected with the processing module.

12. The wireless sensing device according to claim 1, being applied to a Zigbee wireless communication technology.

13. The wireless sensing device according to claim 1, wherein the processing module comprises a central processing unit (CPU) or a micro-controller unit.

14. The wireless sensing device according to claim 1, wherein the processing module and the wireless communication module are constructed in different chips or a single chip.

15. A wireless network sensing system having a plurality of wireless sensing devices for transmitting or receiving a wireless communication signal therebetween, each of the wireless sensing devices comprising:
   a processing module;
   a wireless communication module electrically connected with the processing module to transmit or receive the wireless communication signal;
   at least one sensing element electrically connected with the processing module to transmit a sensing signal to the processing module;
   a power module electrically connected with and supplying a power to the processing module, the wireless communication module and the sensing element; and
   a power-monitoring module electrically connected with the processing module and the power module to transmit a power-monitoring signal to the processing module,
   wherein the wireless communication module comprises a base band circuit and a radio frequency circuit, the base band circuit is in charge of connection establishment and elimination, signal encoding, packet processing and frequency hopping control and the radio frequency circuit is in charge of carrier synthesis, signal reception and signal transmission.

16. The wireless network sensing system according to claim 15, wherein the wireless communication signal satisfies an IEEE 802.15.4 protocol.

17. The wireless network sensing system according to claim 15, wherein the wireless sensing devices are arranged in a star-like, net-like or tree-like topology.

18. The wireless network sensing system according to claim 17, wherein when the wireless sensing devices are arranged in the net-like topology, the wireless network sensing system is capable of supporting up to 65536 end devices.

19. The wireless network sensing system according to claim 15, wherein the sensing element is a temperature sensor, a humidity sensor or a photosensor.

20. The wireless network sensing system according to claim 15, wherein the power is a DC power.

21. The wireless network sensing system according to claim 15, wherein the power module has a battery and/or an AC/DC converter.

22. The wireless network sensing system according to claim 15, wherein the wireless communication module has an antenna, a build-in antenna or an external antenna.

23. The wireless network sensing system according to claim 15, wherein the processing module has a transmission interface, a universal asynchronous receiver/transmitter (UART), an inter-integrated circuit (I2C) bus or a serial peripheral interface (SPI) for communicating with other peripheral devices.

24. The wireless network sensing system according to claim 15, wherein each of the wireless sensing devices further comprises:
   a system procedure monitoring module electrically connected with the processing module to transmit a procedure monitoring signal to the processing module;
   a memory electrically connected with the processing module; and
   a crystal oscillator electrically connected with the processing module.

25. The wireless network sensing system according to claim 15, wherein any one of the wireless sensing devices is capable of communicating with the other wireless sensing devices bi-directionally.

26. The wireless network sensing system according to claim 15, wherein the processing module comprises a central processing unit (CPU) or a micro-controller unit.

27. The wireless network sensing system according to claim 15, wherein the processing module and the wireless communication module are constructed in different chips or a single chip.

* * * * *